United States Patent Office 2,778,840
Patented Jan. 22, 1957

2,778,840

METHOD OF PREPARING 7-DEHYDRO-CHOLESTEROL

Hermann Schaltegger, Neuenegg, near Bern, Switzerland, assignor to Dr. A. Wander A. G., Bern, Switzerland No Drawing. Application February 5, 1953,
Serial No. 335,398

Claims priority, application Switzerland
February 15, 1952

3 Claims. (Cl. 260—397.2)

This invention relates to a method of preparing 7-dehydrocholesterol and more particularly to an improved method of preparing 7-dehydrocholesterol from cholesterol.

It is known to produce sterol mixtures containing 7-dehydrocholesterol by brominating cholesteryl esters with bromo succinimide, treating the resulting bromo compound with tertiary bases to split off hydrogen bromide and to introduce a double bond into the molecule, removing the tertiary base, and saponifying the resulting sterol mixture to produce 7-dehydrocholesterol. The yield of 7-dehydrocholesterol obtained according to this known process depends to a great extent upon the purity of the bromo succinimide employed in this reaction. Former investigations, for instance, of Schaltegger and Muellner "Helvetica Chimica Acta," volume 34 (1951), pages 1096 or 1103 respectively, have shown that the epimeric 7-bromo cholesteryl esters produced on bromination, yield, on treatment with polar solvents, a mixture of epimeric compounds consisting of 40% of 7-alpha-bromo cholesteryl ester and of 60% of 7-beta-bromo cholesteryl ester. Only the 7-alpha-bromo cholesteryl ester yields, on treatment with tertiary bases, 7-dehydrocholesterol in accordance with the epimerization equilibrium. Its yield, however, varies considerably depending upon the purity of the reagents used and upon the treatment to which the intermediates are subjected.

It is one object of this invention to provide an improved method of preparing 7-dehydrocholesterol from cholesterol, thereby increasing its yield and rendering the process more economical.

Other objects and advantages of this invention will appear as the description proceeds.

In principle, the method according to this invention comprises esterifying cholesterol, brominating said esterified cholesterol with bromine with exposure to a light source, and treating the resulting brominated cholesteryl esters dissolved in an inert organic solvent with highly concentrated aqueous alkali at a temperature above 100° C. During said dehydrohalogenation and saponification procedure a lower aliphatic alcohol is preferably added to accelerate the reaction. Products which are obtained thereby, after removing the alkaline agent and the solvents, contain up to 30% of 7-dehydrocholesterol.

It is, of course, also possible to effect esterification and bromination in the same solvent without isolating the ester before such bromination, and then to dehydrohalogenate and saponify the resulting brominated cholesteryl esters, as described above, with aqueous alkali.

One may proceed in such a manner that dehydrohalogenation is accomplished by means of a concentrated solution of a compound capable of combining with and binding the hydrogen bromide split off whereupon the reaction product is saponified by means of alcoholic alkali. Preferably aqueous solutions of inorganic compounds, such as, for instance, alkali carbonates, alkali bicarbonates, alkaline earth hydroxides, alkaline earth carbonates and the like are used as hydrogen bromide binding agents.

Another variation of the method according to this invention comprises isolating the brominated cholesteryl ester in crystalline form as a 90% to 95% crude starting material and reacting such isolated dextrorotatory 7-bromo cholesteryl ester with hot aqueous alkaline.

In this modification of the method according to this invention there may also be used other agents which combine with hydrogen bromide, in the place of alkali hydroxides, provided the reaction mixture is subsequently saponified by means of alcoholic alkali.

The advantages of the new improved method according to this invention and of its modifications over the known processes are as follows:

1. The process is much more economical than the known processes because, on the one hand, bromine is used as halogenating agent and the reaction with the expensive bromo succinimide is avoided while, on the other hand, the tertiary bases are substituted by the less expensive aqueous alkali hydroxide solutions.

2. It is not necessary to separately saponify the 7-dehydrocholesteryl esters. On the contrary, dehydrohalogenation and saponification are effected by alkali in one and the same step of operation.

3. An increased yield of 7-dehydrocholesterol is achieved.

The following examples serve to illustrate this invention without, however, limiting the same thereto.

*Example 1*

38.6 g. of cholesterol are dissolved in 100 cc. of carbon disulfide. 5.0 g. of ketene are passed into said solution at 5° C. to acetylate the cholesterol. The ketene-free solution is then diluted with carbon disulfide to a volume of 1,100 cc. and is heated to boiling in a low partial vacuum. At the same time a solution of 8.0 g. of bromine in 200 cc. of carbon disulfide is added drop by drop within 20 minutes to the boiling solution of cholesterol acetate. The mixture, during the addition of bromine, is uniformly exposed to the light of eight 100 watt-lamps. Hydrogen bromine formed thereby is continuously distilled off together with carbon disulfide. When the bromination is complete, the reaction mixture is evaporated to dryness in a vacuum and the residue is dissolved in 500 cc. of xylene. Said xylene solution is added within 20 minutes, while stirring, to a boiling mixture of 80 g. of aqueous 50% sodium hydroxide solution and 400 cc. of xylene. After 40 minutes so much alcohol (about 250 cc.) is added that a homogeneous one-phase solution is formed. Boiling said mixture in a nitrogen atmosphere is continued for 30 minutes. Thereby hydrogen bromide is split off and the ester is saponified. When dehydrohalogenation and saponification are complete, the mixture is diluted with water and the aqueous alkali hydroxide solution is separated from the xylene solution. On evaporating said xylene solution in a vacuum to dryness, a sterol mixture is obtained containing 30.5% of 7-dehydrocholesterol. The 7-dehydrocholesterol content is determined photometrically.

*Example 2*

38.6 g. of cholesterol are dissolved in 200 cc. of carbon disulfide. 16.9 g. of benzoyl chloride are added to said solution. The mixture is heated to boiling under reflux for 2 hours and the hydrogen chloride formed thereby is removed by passing nitrogen through the solution. When esterification is complete, cholesteryl benzoate is isolated in the form of a crystalline product. It is further purified by recrystallization from benzene/aethanole 1:2 and is used in such recrystallized form for bromination. 49 g. of the ester obtained in this manner are dissolved in 1,100 cc. of carbon disulfide. The solution is heated to boiling in a low partial vacuum. The ester is brominated with 8 g. of bromine in the same manner as described in Example 1. The solvent is removed by vacuum distillation. The residue is dissolved in 200 cc. of xylene. The xylene solution is added, within 30 minutes, to a boiling mixture of 70 cc. of xylene, 20 g. of potassium hydroxide, and 20 cc. of water. So much isopropanol (about 100 cc.) is added that a homogeneous solution is formed when heating. Said solution is boiled under reflux in a nitrogen atmosphere for 30 minutes. The reaction mixture is then worked up as described in Example 1. The sterol mixture obtained thereby contains about 33% of dehydrocholesterol. Recrystallization from a chloroform-acetone mixture (1:5) or from an ether-methanol mixture (1:5) yields 12 g. of an 87% dehydrocholestrol having a melting point of 132–136° C.

Example 3

38.6 g. of cholesterol are benzoylated as described in Example 2. When esterification is complete, the ester, without isolating it from the esterification solution, is directly brominated as described in Examples 1 and 2. A resinous reaction product is isolated from the bromination mixture by removing the solvent by vacuum distillation. 35.4 g. of 92% 7-bromo cholesteryl benzoate are obtained in this manner. This bromine compound is dissolved in 150 cc. of xylene and the solution is added, within 20 minutes, to a boiling mixture of 12 g. of sodium hydroxide, 12 cc. of water, and 50 cc. of xylene. After a short period of time sodium bromide begins to precipitate. After all of the bromo cholesteryl benzoate solution has been added to the dehydrohalogenation and saponification solution, the reaction mixture is allowed to boil under reflux for 5 minutes. 300 cc. of methanol and 20 cc. of dioxane are added. The mixture, when heated, forms a single phase. Boiling is continued for 40 minutes. After cooling a large amount of water and some ether are added and the aqueous phase is separated and removed. The ether-xylene solution is dried and the solvents are distilled off in a vacuum. 22.6 g. of a sterol mixture containing about 46.3% of 7-dehydrocholesterol are obtained. The 7-dehydrocholesterol content is determined spectrometrically.

Example 4

A solution of 5.7 g. of 88% 7-bromo cholesteryl benzoate in 28 cc. of xylene is added drop by drop, within 15 minutes, to a boiling two-phase mixture of 3.5 g. of potassium carbonate, 3.5 cc. of water, and 7.0 cc. of xylene and boiling under reflux is continued for 15 minutes. 50 cc. of methanolic 5% potassium hydroxide solution and 20 cc. of methanol are then added and boiling of the mixture is further continued for half an hour to cause saponification. On working up the reaction mixture as described in the preceding examples, a sterol mixture containing 29% of 7-dehydrocholesterol is obtained. Its 7-dehydrocholesterol content is determined spectroscopically.

In the place of potassium carbonate there may be used equimolecular amounts of sodium carbonate, calcium hydroxide, sodium bicarbonate, calcium carbonate and others.

In the place of xylene there may be employed other inert organic solvents having a boiling point above 100° C., especially other organic hydrocarbons which are inert to the reactants, such as toluene, aethylbenzene, n-octan and so on.

In the place of ketene and acid chlorides used in the preceding examples as esterifying agents, there may be used for the same purpose acid anhydrides, such as acetic acid anhydride, propionic acid anhydride, isopropionic acid anhydride and others in equimolecular amounts.

The yield achieved by the process according to this invention is at least 15% better than in any of the known processes of making 7-dehydrocholesterol. Furthermore, the purity of the reaction product is far superior to any of the known reaction products. Therefore it is very simple and requires only a few operations to isolate substantially pure 7-dehydrocholesterol from the sterol reaction mixture.

I claim:

1. In a process of producing 7-dehydrocholesterol from 7-bromo cholesteryl esters, the steps comprising dissolving a 7-bromo cholesteryl ester selected from the group consisting of lower aliphatic acid esters and benzoic acid ester of 7-bromo cholesterol, in an inert hydrocarbon solvent having a boiling point above 100° C., adding to said solution a concentrated aqueous solution of a hydrogen bromide-binding compound selected from the group consisting of an alkali metal hydroxide, an alkali metal carbonate, an alkali metal bicarbonate, an alkaline earth metal hydroxide, an alkaline earth metal carbonate, and mixtures thereof, heating the reaction mixture at a temperature above 100° C. to effect dehydrohalogenation, adding to said reaction mixture an amount of a lower aliphatic alcohol sufficient to form a homogeneous one-phase solution, and continuing heating until dehydrohalogenation and saponification are substantially complete.

2. In a process of producing 7-dehydrocholesterol from 7-bromo cholesteryl esters, the steps comprising dissolving a 7-bromo cholesteryl ester selected from the group consisting of lower aliphatic acid esters and benzoic acid ester of 7-bromo cholesterol, in an inert hydrocarbon solvent having a boiling point above 100° C., adding to said solution a concentrated aqueous solution of sodium hydroxide, heating the reaction mixture at a temperature above 100° C. to effect dehydrohalogenation, adding to said reaction mixture an amount of a lower aliphatic alcohol sufficient to form a homogeneous one-phase solution, and continuing heating until dehydrohalogenation and saponification are substantially complete.

3. In a process of producing 7-dehydrocholesterol from 7-bromo cholesteryl esters, the steps comprising dissolving a 7-bromo cholesteryl ester selected from the group consisting of lower aliphatic acid esters and benzoic acid ester of 7-bromo cholesterol, in xylene, adding to said solution an at least 50% aqueous solution of sodium hydroxide, heating the reaction mixture at a temperature above 100° C. to effect dehydrohalogenation, adding to said reaction mixture an amount of ethanol sufficient to form a homogeneous one-phase solution, and continuing heating until dehydrohalogenation and saponification are substantially complete.

References Cited in the file of this patent

UNITED STATES PATENTS

| 2,441,091 | Vliet | May 4, 1948 |
| 2,500,576 | Ruigh | Mar. 14, 1950 |
| 2,633,451 | Schaltegger | Mar. 31, 1953 |
| 2,642,446 | Knapp | June 16, 1953 |

FOREIGN PATENTS

| 656,115 | Great Britain | 1951 |
| 995,866 | France | 1951 |